(12) United States Patent
Deitz et al.

(10) Patent No.: US 6,980,510 B1
(45) Date of Patent: Dec. 27, 2005

(54) HOST INTERFACE ADAPTIVE HUB STORAGE SYSTEM

(75) Inventors: William G. Deitz, Niwot, CO (US); Mohamad El-Batal, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 09/660,566

(22) Filed: Sep. 12, 2000

(51) Int. Cl.$^7$ ............................................. H04J 1/16
(52) U.S. Cl. ................................... 370/217; 370/222
(58) Field of Search .................... 370/462, 216–228

(56) References Cited

U.S. PATENT DOCUMENTS

| | | | |
|---|---|---|---|
| 5,535,035 A | 7/1996 | DeFoster et al. | 359/161 |
| 5,694,615 A | 12/1997 | Thapar et al. | 395/822 |
| 5,751,715 A | 5/1998 | Chan et al. | 370/455 |
| 5,757,642 A | 5/1998 | Jones | 364/134 |
| 5,812,754 A | 9/1998 | Lui et al. | 395/182.04 |
| 5,898,828 A | 4/1999 | Pignolet et al. | 395/182.04 |
| 5,901,151 A | 5/1999 | Bleiweiss et al. | 370/480 |
| 5,922,077 A | 7/1999 | Espy et al. | 714/7 |
| 5,966,487 A * | 10/1999 | Gilliland et al. | 385/92 |
| 5,978,379 A | 11/1999 | Chan et al. | 370/403 |
| 5,991,891 A * | 11/1999 | Hahn et al. | 714/4 |
| 6,000,020 A | 12/1999 | Chin et al. | 711/162 |

(Continued)

FOREIGN PATENT DOCUMENTS

EP         0869641 A2    10/1998    ......... H04L 12/433

(Continued)

OTHER PUBLICATIONS

C. J. Kimble et al., "A Communication System for an Array of Direct Access Storage Devices", filed Jun. 10, 1997, U.S. Appl. No. 08/871,945.

(Continued)

*Primary Examiner*—Andy Lee
(74) *Attorney, Agent, or Firm*—Kunzler & Associates

(57) ABSTRACT

A host interface dual active fibre channel adaptive hub includes two fibre channel arbitrated loops, a loop healing switch coupled to both loops, and four loop resiliency circuits. Each loop has a controller and a host server coupled to it through a respective loop resiliency circuit. The host servers issue I/O requests to the controllers through the dual fibre channel arbitrated loops. Therefore in normal operation, with both loops active and both controllers operational, the system provides twice the bandwidth of a conventional single loop fibre channel arbitrated loop system. The loop resiliency circuits detect failures in the controllers. If a loop resiliency circuit detects a failure in a controller, the loop resiliency circuit outputs a failure signal to the loop healing switch. A failed controller also notifies the loop healing switch that it has failed. The loop healing switch then switches to couple the two fibre channel arbitrated loops into a single loop. Also the loop resiliency circuit switches the failed controller out of the loop. At the same time, the surviving controller starts a failover process to claim ownership of all disk drives in the system, and present the failed controller's logical units (LUNs) on its host port as well as it own LUNs. Using the multiple target ID capability of the controller, the surviving controller host port now responds to requests from both host servers by assuming the arbitrated loop physical address (ALPA) and World Wide Name (WWN) of the failed controller in addition to its own ALPA and WWN. Combining the dual fibre channel arbitrated loops with the loop healing switch thereby provides both servers an access path through the surviving controller to the disk drive array.

23 Claims, 3 Drawing Sheets

U.S. PATENT DOCUMENTS

| | | | |
|---|---|---|---|
| 6,088,141 A * | 7/2000 | Merli et al. | 398/5 |
| 6,101,166 A * | 8/2000 | Baldwin et al. | 370/222 |
| 6,185,203 B1 * | 2/2001 | Berman | 370/351 |
| 6,226,111 B1 * | 5/2001 | Chang et al. | 370/223 |
| 6,289,002 B1 * | 9/2001 | Henson et al. | 370/222 |
| 6,324,181 B1 * | 11/2001 | Wong et al. | 370/403 |
| 6,381,674 B2 * | 4/2002 | DeKoning et al. | 711/113 |
| 6,542,954 B1 * | 4/2003 | Aruga | 710/316 |
| 6,549,988 B1 * | 4/2003 | Gertner | 711/141 |
| 6,651,154 B1 * | 11/2003 | Burton et al. | 711/202 |
| 6,658,478 B1 * | 12/2003 | Singhal et al. | 709/232 |
| 6,697,914 B1 * | 2/2004 | Hospodor et al. | 711/112 |
| 6,725,293 B1 * | 4/2004 | Nakayama et al. | 710/36 |

FOREIGN PATENT DOCUMENTS

| | | | |
|---|---|---|---|
| JP | 11032068 | 2/1999 | H04L 12/437 |

OTHER PUBLICATIONS

"Fibre Channel—Low-Cost Redundant Loop", IBM Technical Disclosure Bulletin, vol. 37, No. 4A, Apr. 1994, p663-664.

* cited by examiner

HOST INTERFACE ADAPTIVE HUB STORAGE SYSTEM

BACKGROUND OF THE INVENTION

1. Field of the Invention

The present invention relates to computer networks, and more particularly to a multi-active fibre channel arbitrated loop adaptive hub.

2. Description of Related Art

Basic RAID storage systems include an array of redundant disks and a controller that enables a server to transparently access the array. A RAID system greatly improves storage system reliability as data can be stored on multiple disks within the array. A RAID system also reduces the cost of storage, when compared to a mirrored storage system solution.

An improved RAID storage system includes dual controllers, each configured to access the same array of disks. The dual controllers improve access to the array because the controllers can simultaneously serve I/O requests from two servers. Moreover, a dual controller (duplex) system can offer even greater reliability than a single controller (simplex) system if each dual controller is configured to handle all I/O requests in the case the other fails. This capability is called "transparent failover."

Whenever two fibre channel disk array controllers are used in an active—active system configuration, it is vital for that system to continue normal operations even when either one of the two controllers has failed for any reason. In an exemplary conventional dual controller fibre channel arbitrated loop ("FCAL") system, each of the two disk array controllers has a single FCAL host port. Both of the controllers and the host servers are coupled to a single loop. The controllers can operate in duplex mode (as a redundant pair of controllers) or in simplex mode (as independent controllers).

When configured as a redundant pair, both controllers have access to the same disk drives and both process host server I/O requests. Communication signals between the controllers keep each informed that the other controller is operating normally. If the communication signals are interrupted, the controller that detects the interruption asserts the reset signal to the other controller (holding the failed controller in a hard reset) and starts processing I/O for both controllers. This failover is transparent to the host servers because the surviving controller can respond to multiple target IDs on the host bus. Interruption of the communication signal can result from a controller being removed from the system or the controller experiencing a fault that causes it to lockup when some abnormal operation occurs.

Having the controller host ports and host bus adapters (HBAs) connected on the same loop is a major host port bandwidth limitation of conventional active—active FCAL disk array systems. The overall system bandwidth of a single loop system is approximately one half the bandwidth of a system with two loops, two HBAs and two active—active controllers. In conventional systems both sets of controllers and HBAs are on the same loop to allow for host transparent controller failure recovery.

A need exists for an improved FCAL system that provides the bandwidth and the fault tolerance of a dual active loop controller system, while maintaining the flexibility of a single loop system to overcome the foregoing and other problems of the prior art.

SUMMARY OF THE INVENTION

An object of the present invention is therefore to provide the full bandwidth and the fault tolerance of dual active loop controller systems, while maintaining the failover capabilities of a single loop system.

To achieve the foregoing object, and to overcome other limitations that will be apparent from the present specification, the present invention provides a host interface adaptive hub storage system. In a preferred embodiment of the present invention, a storage subsystem comprises two host servers, two controllers, a dual active fibre channel adaptive hub and an array of disk drives. The dual active fibre channel adaptive hub includes two fibre channel arbitrated loops, a loop healing switch coupled to both loops, and four loop resiliency circuits. Each loop has a controller and a host server coupled to it through a respective loop resiliency circuit.

In operation, the host servers issue I/O requests to the controllers through the dual fibre channel arbitrated loops. In one embodiment, each controller provides 100 MB/sec. access to data stored in the disk drive array. Therefore in normal operation, with both loops active and both controllers operational, data is transferred between the disk drive array and the host servers at a rate of 200 MB/sec. This provides twice the bandwidth of a conventional single loop fibre channel arbitrated loop system.

The loop resiliency circuits detect failures in the controllers. If a loop resiliency circuit detects a failure in a controller, the loop resiliency circuit outputs a failure signal to the loop healing switch. In a preferred embodiment a failed controller also notifies the loop healing switch that it has failed. The loop healing switch then switches to couple the two fibre channel arbitrated loops into a single loop. Also the loop resiliency circuit switches the failed controller out of the loop. At the same time, the surviving controller starts a failover process to claim ownership of all disk drives in the system, and present the failed controller's logical units (LUNs) on its host port as well as it own LUNs. Using the multiple target ID capability of the controller, the surviving controller host port now responds to requests from both host servers by assuming the arbitrated loop physical address (ALPA) and World Wide Name (WWN) of the failed controller in addition to its own ALPA and WWN. Combining the dual fibre channel arbitrated loops with the loop healing switch thereby provides both servers an access path through the surviving controller to the disk drive array.

BRIEF DESCRIPTION OF THE DRAWINGS

Additional objects and features of the invention will be more readily apparent from the following detailed description and appended claims when taken in conjunction with the drawings, in which like reference numbers represent corresponding parts throughout:

DETAILED DESCRIPTION OF THE PREFERRED EMBODIMENTS

Figure 1:
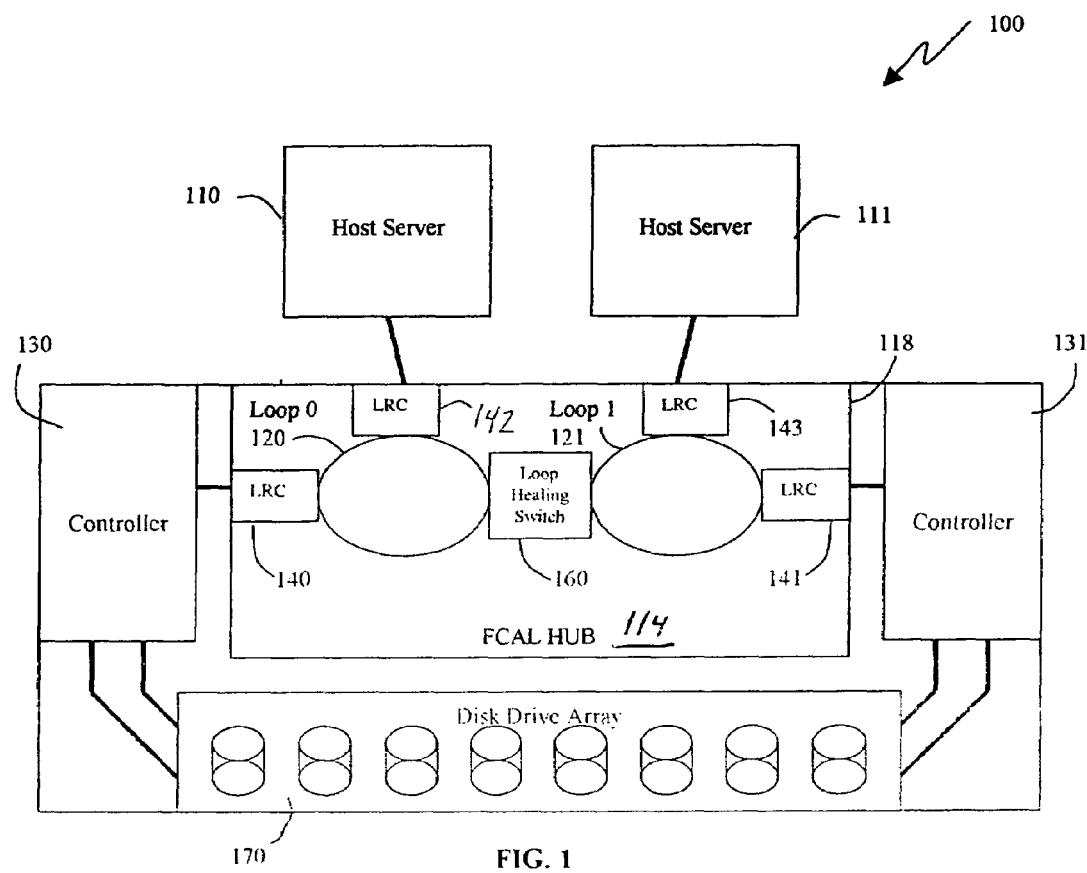
FIG. 1 illustrates a block diagram of a network including a fibre channel dual arbitrated loop (FCAL) storage system according to an embodiment of the present invention.

The present invention provides a host interface adaptive fibre channel hub with the capability of providing the full host port bandwidth of a dual-active system, under normal operating conditions, and the fault tolerance of a single loop system with minimal added cost. FIG. 1 illustrates a block diagram of a network 100 including two host servers 110, 111 and a fibre channel dual arbitrated loop (FCAL) storage system 114 according to an embodiment of the present invention. Storage system 114 comprises an adaptive host interface FCAL hub 118, two RAID controllers 130, 131, an array of disk drives 170, and two servers 110, 111. FCAL hub 118 comprises loop 0 (120), loop 1 (121), a loop healing switch (LHS) 160, and four loop resiliency circuits (LRCs) 140–143. Loop healing switch 160 is coupled to both loops 120 and 121. Host server 110 and controller 130 are each coupled to loop 120 through a loop resiliency circuit 142, 140 respectively. Similarly, host server 111 and controller 131 are each coupled to loop 121 through a loop resiliency circuit 143, 141 respectively. In a preferred embodiment, FCAL hub 118 is a copper FCAL hub. The present invention may also be implemented in optical FCAL systems.

In operation, host servers 110, 111 issue I/O requests to controllers 130, 131 through loops 120, 121. In one embodiment, each controller 130, 131 provides 100 MB/sec. access to data stored in disk drive array 170. Therefore in normal operation, with both loops active and both controllers operational, data is transferred between disk drive array 170 and servers 110, 111 at a rate of 200 MB/sec. This provides twice the bandwidth of a conventional single loop FCAL system. In the FIG. 1 embodiment only one server is coupled to each loop, however, many servers can be coupled to a single FC arbitrated loop.

On the physical layer of the device, each FC host port on the controllers has an arbitrated loop physical address (ALPA) and World Wide Name (WWN). If a server wants to issue a write or a read command to either of the controllers it will add on to the command frame header the ALPA and WWN of that controller. Each controller FCAL host port is configured to present a single logical unit (LUN) to an FCAL host bus adapter (HBA) residing on a host server. A LUN is a logical representation of a storage device, a single physical disk may be divided into multiple LUNs. Also a host server may have multiple HBAs with each HBA processing I/O requests for a corresponding LUN.

Loop resiliency circuits 140–143 detect failures in the controllers. For example in the event of a failure of controller 130, this failure would be detected by loop resiliency circuit 140. In a preferred embodiment a failed controller also notifies loop healing switch 160 that it has failed. Loop healing switch 160 then switches to couple the two loops 120 and 121 into a single loop. In response to a failure of controller 130, loop resiliency circuit 140 switches failed controller 130 out of the loop. At the same time, surviving controller 131 would start a failover process to claim ownership of all disk drives in the system, and present the failed controller's 130 LUNs on its host port as well as it own LUNs. Using the multiple target ID capability of the controller, the surviving controller 131 host port now responds to requests from both host servers by assuming the ALPA and WWN of failed controller 130 in addition to its own ALPA and WWN. Combining loops 120 and 121 with loop healing switch 160 thereby provides both host servers 110, 111 an access path through surviving controller 131 to disk drive array 170.

While only two loops are shown in FIG. 1, the adaptive HUB system of the present invention can be expanded to include 2N FC Arbitrated Loops under normal operating conditions, and automatically switch down to N loops upon the detection of a controller failure, where N is an integer. An adaptive HUB with 2N FC arbitrated loops would use N loop healing switches. In one embodiment the loop healing switches can be implemented using a custom ASIC. The loop healing switches can also be implemented with off the shelf circuits, such as two VSC7140 Dual Port Bypass devices available from Vitesse Semiconductor. Alternatively, the loop healing switches can be implemented using discrete components.

Figure 2:
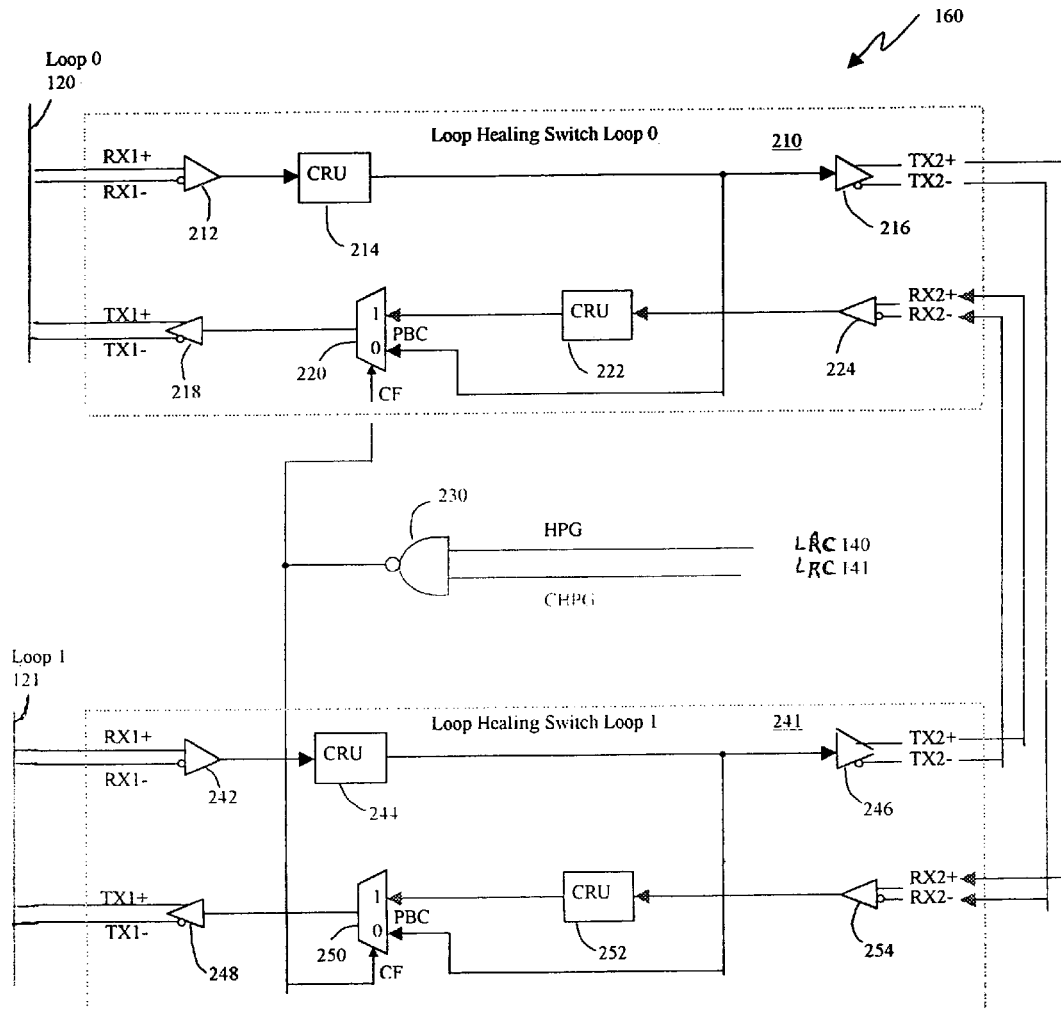
FIG. 2 illustrates a detailed block diagram of a loop healing switch according to an embodiment of the present invention.

FIG. 2 illustrates a detailed block diagram of loop healing switch 160. Loop healing switch 160 has the intelligence to detect a controller failure, and to respond by coupling two FC arbitrated loops. Loop healing switch 160 includes a loop 0 block 210 and a loop 1 block 241. The receive terminals RX1+, RX1− and the transmit terminals TX1+, TX1− of loop 0 block 210 are coupled to a first FC arbitrated loop, such as loop 120 shown in FIG. 1. The receive terminals RX2+, RX2− and the transmit terminals TX2+, TX2− of loop 0 block 210 are coupled to a second FC arbitrated loop, such as loop 121 shown in FIG. 1. The host port good (HPG) control signals indicate whether a controller host port has failed. HPG is an active high signal. In normal operation both of the HPG control signals are logic 1 signals. The output of NAND gate 230 is the controller fault (CF) signal. In normal operation the CF signal is a logic 0 signal. The CF signal is coupled to port bypass circuits (PBC) 220 and 250. The port bypass circuits provide a two to one multiplexer function based on the status of the select signal. With CF a logic 0, port bypass circuits 220, 250 couple the 0 input terminal to the port bypass circuit output terminal.

In loop healing switch loop 0 block 210, a FC signal is received from loop 0 at receive buffer 212. The signal is then coupled to clock recovery unit (CRU) 214. Clock recovery unit 214 reconditions the FC signal and is capable of driving the signal over the maximum theoretical cable length defined in the applicable FC specification. The clock recovery unit 214 uses its internal FC clock source to synchronize with the incoming FC signal frequency and reduce its jitter characteristics before re-driving the FC signal through its output at the proper long cable signaling amplitude. The clock recovery unit 214 output is coupled to the 0 input of port bypass circuit 220 and transmit buffer 216. In normal operation with the CF signal a logic 0 the clock recovery unit 214 output signal is coupled through port bypass circuit 220 to transmit buffer 218. Transmit buffer 218 outputs the FC signal back onto loop 0.

In loop healing switch loop 1 block 241, as described above in regard to loop 0 block 210, loop 1 FC signals are coupled through the corresponding loop 1 block 241 circuits. The loop 0 FC signal output of transmit buffer 216 is coupled to receive buffer 254. Receive buffer 254 provides loop 0 FC signals to clock recovery unit 252. Clock recovery unit 252 couples the loop 0 FC signal to port bypass circuit 250 input 1. However, in normal operation the CF signal is a logic 0 which couples the port bypass circuit 250 input 0 to the output. Thus in normal operation loop healing switch 160 maintains loops 0 and 1 as separate independent loops and does not couple signals from one loop to the other.

In the event of a failure of a controller coupled to loop 0, for example controller 130 shown in FIG. 1, or a failure of a controller coupled to loop 1, for example controller 131 shown in FIG. 1, one of the inputs to NAND gate 230 will switch to a logic 1. The NAND 230 output signal, CF, will therefore be a logic 1 which selects input 1 of port bypass circuits 220 and 250. As a result port bypass circuit 220 couples loop 1 FC signals to loop 0 through transmit buffer 218, and port bypass circuit 250 couples loop 0 FC signals to loop 1 through transmit buffer 248. In fault mode loop healing switch 160 thereby couples the two FC arbitrated loops 120, 121 shown in FIG. 1 into a single FC arbitrated loop. This provides each of the servers coupled to loops 120 and 121 access to disk drive array 170 through the surviving controller.

Figure 3:
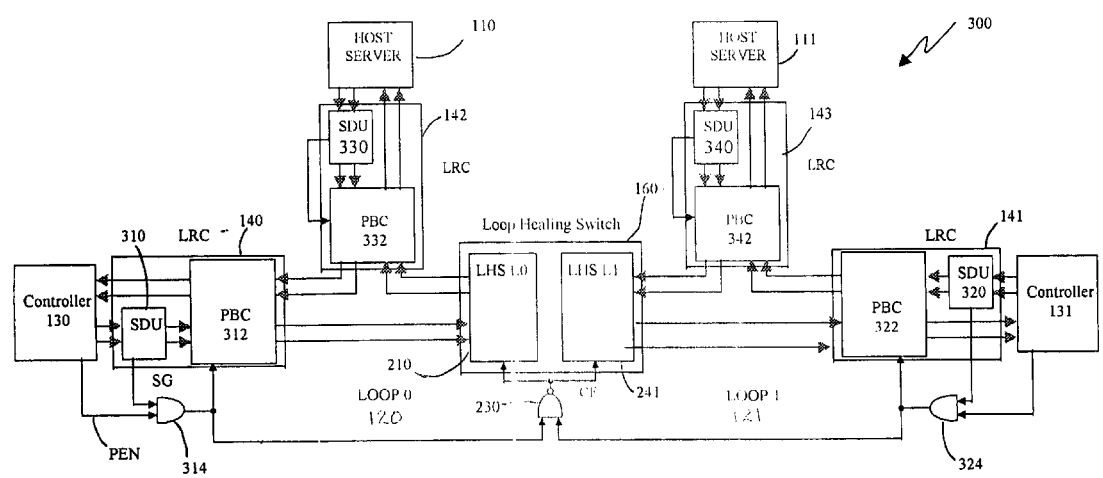
FIG. 3 illustrates a detailed block diagram of the loop resiliency circuits according to an embodiment of the present invention.

FIG. 3 illustrates a detailed block diagram of loop resiliency circuits 140–143 and associated circuits from system 100 shown in FIG. 1. Each loop resiliency circuit includes a signal detection unit (SDU) and a port bypass circuit (PBC). Signal detection units monitor the condition of incoming FC signals. When a fault in the system occurs that causes the incoming FC signal to not meet predetermined minimum FC signal requirements, the signal detection unit transmits a signal to loop healing switch 160 indicating a failure has occurred.

In normal operating conditions the select signal of the port bypass circuits 312, 322, 332, 342 in the loop resiliency circuits is a logic 1, and the inputs to the port bypass circuits pass directly through to the outputs. For example, under normal operating conditions the SDU 330 inputs to port bypass circuit 332 in loop resiliency circuit 142 are coupled through port bypass circuit 332 to the inputs of port bypass circuit 312. The loop healing switch loop 0 block 210 inputs to port bypass circuit 332 are coupled through port bypass circuit 332 to host server 110.

When a fault is detected, the loop side inputs of the loop resiliency circuit at the location of the fault, are switched to be coupled to the loop side outputs, and the non-loop inputs of the loop resiliency circuit are decoupled from the outputs. As a result, in fault operating mode the loop signals at the loop resiliency circuit at the location of the fault pass directly through the loop resiliency circuit and continue around the loop; while the non-loop inputs of the loop resiliency circuits are isolated from the loop.

For example, loop resiliency circuit 140 is the loop resiliency circuit for RAID controller 130. If signal detection unit 310 detects that controller 130 has failed, then in response to the failure, signal detection unit 310 outputs a logic 0 signal to AND gate 314. The AND gate 314 output switches to a logic 0. The AND gate 314 output is coupled to the select terminal of port bypass circuit 312. With the AND gate 314 output at logic 0, the host server/loop inputs of port bypass circuit 312 are coupled to the loop healing switch/loop outputs, while the controller 130 inputs to port bypass circuit 312 are isolated. The AND gate 314 output is also coupled to NAND gate 230. A logic 0 input to NAND gate 230, causes the NAND gate 230 output signal, CF, to switch to a logic 1. CF switching to logic 1 places loop healing switch 160 in fault operation mode and thereby couples loops 120 and 121 to form a single FC arbitrated loop.

There are controller failure modes that a signal detection unit may not detect. For example, a controller may only intermittently stop functioning for short time periods. To detect such failure conditions, the controllers 130, 131 have a loop port enable (LPEN) output. For example, the controller 130 loop port enable output is coupled to an input of AND gate 314. When controller 130 fails, the loop port enable output switches to a logic 0 which causes the AND gate 314 output to be a logic 0. As a result the CF signal is a logic 1 and loop healing switch 160 is placed in fault mode, in which it couples loops 120 and 121 to form a single loop.

Host server 110, 111 failures are detected by the corresponding loop resiliency circuit 142, 143. When a host server fails the corresponding loop resiliency circuit disconnects that host from the loop. For example, if signal detection unit 330 detects that host server 110 has failed, signal detection unit 330 outputs a logic 0 to the select terminal of port bypass circuit 332. This causes port bypass circuit 332 to couple the port bypass circuit 332 loop inputs to the port bypass circuit 332 loop outputs and disconnect host server 110 from the loop.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims, for example, in addition to fibre channel systems the present invention may be implemented in other types of networks including Infiniband and high speed Ethernet networks, such as Gigabit Ethernet.

What is claimed is:

1. A host interface adaptive hub, comprising:
a first loop residing within the host interface adaptive hub;
a second loop residing within the host interface adaptive hub;
a first host server interface terminal coupled to the first loop, the first loop actively transporting data between a first host server and a first storage controller;
a second host server interface terminal coupled to the second loop, the second loop actively transporting data between a second host server and a second storage controller;
a loop healing switch coupled to the first loop and the second loop, wherein upon detection of a failure of the first storage controller, the loop healing switch couples the first loop and the second loop and the second storage controller presents logical units associated with the first storage controller to the second host server, the second storage controller servicing data storage requests from the first host server and the second host server.

2. The host interface adaptive hub of claim 1 wherein the adaptive hub is a fibre channel adaptive hub further comprising:
a first storage controller terminal; and
a second storage controller terminal.

3. The host interface adaptive fibre channel hub of claim 2 further comprising:
a first loop resiliency circuit coupled between the first loop and the first storage controller terminal; and
a second loop resiliency circuit coupled between the second loop and the second storage controller terminal.

4. The host interface adaptive fibre channel hub of claim 3 wherein the loop resiliency circuits comprise:
a port bypass circuit; and
a signal detection unit, wherein when the signal detection unit detects a failure of a controller coupled to the signal detection unit, the signal detection unit disconnects the controller from a loop coupled to the loop resiliency circuit.

5. The host interface adaptive fibre channel hub of claim 2 further comprising a first logic module to check for the presence of a loop port enable signal from a controller coupled to the host interface adaptive fibre channel hub, and wherein when the loop port enable signal indicates there is a fault in the controller, the first logic module outputs a signal to cause the loop healing switch to couple the first loop and the second loop.

6. The host interface adaptive hub of claim 1 further comprising:
   a third loop resiliency circuit coupled between the first loop and the first host server interface terminal; and
   a fourth loop resiliency circuit coupled between the second loop and the host server interface terminal, wherein when one of the third and fourth loop resiliency circuits detects a failure in a corresponding host server, the loop resiliency circuit disconnects the corresponding host server from the loop.

7. The host interface adaptive hub of claim 1 wherein the host interface adaptive hub is a copper fibre channel hub.

8. The host interface adaptive hub of claim 1 wherein a bandwidth of the host interface adaptive hub with the first and second loops disconnected is approximately twice the bandwidth of the host interface adaptive hub with the first and second loops coupled together.

9. A storage subsystem, comprising:
   a first storage controller;
   a second storage controller; and
   a host interface adaptive fibre channel hub comprising:
      a first loop coupled to the first storage controller, the first loop actively transporting data between a first host server and the first storage controller;
      a second loop coupled to the second storage controller, the second loop actively transporting data between a second host server and a second storage controller;
      a first host server interface terminal coupled to the first loop;
      a second host server interface terminal coupled to the second loop; and
      a loop healing switch coupled to the first loop and the second loop, wherein upon detection of a communication failure within the first loop the loop healing switch couples the first loop and the second loop such that data storage requests from the first host server and the second host server are serviceable by the second storage controller, the second storage controller presenting logical units associated with the first storage controller to the second host server.

10. The storage subsystem of claim 9, further comprising a disk drive array, and wherein the first and second storage controllers further comprise RAID storage controllers.

11. The storage subsystem of claim 9 wherein the adaptive fibre channel hub further comprises:
    a first storage controller terminal; and
    a second storage controller terminal.

12. The storage subsystem of claim 11 wherein the host interface adaptive fibre channel hub further comprises:
    a first loop resiliency circuit coupled between the first loop and the first storage controller terminal; and
    a second loop resiliency circuit coupled between the second loop and the second storage controller terminal.

13. The storage subsystem of claim 12 wherein the loop resiliency circuits comprise:
    a port bypass circuit; and
    a signal detection unit, wherein when the signal detection unit detects a failure of a controller coupled to the signal detection unit, the signal detection unit disconnects the controller from a loop coupled to the loop resiliency circuit.

14. The storage subsystem of claim 11 wherein the host interface adaptive fibre channel hub further comprises a first logic module to check for the presence of a loop port enable signal from a controller coupled to the host interface adaptive fibre channel hub, and wherein when the loop port enable signal indicates there is a fault in the controller, the first logic module outputs a signal to cause the loop healing switch to couple the first loop and the second loop.

15. The storage subsystem of claim 9 wherein the host interface adaptive hub further comprises:
    a third loop resiliency circuit coupled between the first loop and the first host server interface terminal; and
    a fourth loop resiliency circuit coupled between the second loop and the host server interface terminal, wherein when one of the third and fourth loop resiliency circuits detects a failure in a corresponding host server, the loop resiliency circuit disconnects the corresponding host server from the loop.

16. The storage subsystem of claim 9 wherein the host interface adaptive hub is a copper fibre channel hub.

17. The storage subsystem of claim 9 wherein a bandwidth of the host interface adaptive hub with the first and second loops disconnected is approximately twice the bandwidth of the host interface adaptive hub with the first and second loops coupled together.

18. A host interface adaptive hub, comprising:
    a first loop residing within the host interface adaptive hub;
    a second loop residing within the host interface adaptive hub;
    a first host server interface terminal coupled to the first loop, the first loop actively transporting data between a first host server and a first storage controller;
    a second host server interface terminal coupled to the second loop, the second loop actively transporting data between a second host server and a second storage controller; and
    a means for coupling the first loop and the second loop such that data storage requests from the first host server and the second host server are serviceable be the second storage controller and the second storage controller presents logical units associated with the first storage controller to the second host server, in response to detection of a failure of components of the first loop.

19. A method for providing a host interface adaptive hub, comprising:
    evaluating signals from a first controller coupled to a first loop to check for a failure;
    evaluating signals from a second controller coupled to a second loop to check for a failure; and
    upon detection of a failure affecting access to one of the first controller and the second controller, coupling the first loop to the second loop so as to provide a plurality of host servers access to a surviving controller the surviving storage controller falling over logical units associated with an inaccessible storage controller to the plurality of host servers such that data storage requests from the plurality of host servers are serviceable by the surviving storage controller.

20. The method for providing a host interface adaptive hub of claim 19 further comprising:
    checking for a storage controller failure; and
    when a storage controller failure is detected, disconnecting the failed controller from the corresponding loop.

21. The method for providing a host interface adaptive hub of claim 19 wherein the host interface adaptive hub further comprises:
    checking for a host server failure; and
    when a host server failure is detected, disconnecting the failed host server from the corresponding loop.

22. The method for providing a host interface adaptive hub of claim 19 wherein a bandwidth of the host interface adaptive hub with the first and second loops disconnected is approximately twice the bandwidth of the host interface adaptive hub with the first and second loops coupled together.

23. The method for providing a host interface adaptive hub of claim 19 wherein the host interface adaptive hub is a copper fibre channel adaptive hub.

* * * * *